US012717069B2

(12) United States Patent
Park et al.

(10) Patent No.: US 12,717,069 B2
(45) Date of Patent: Aug. 25, 2026

(54) DOUBLE SIDED META LENS AND ELECTRONIC DEVICE INCLUDING THE SAME

(71) Applicant: SEOUL NATIONAL UNIVERSITY R&DB FOUNDATION, Seoul (KR)

(72) Inventors: Yeongmyeong Park, Gwangyang-si (KR); Youngjin Kim, Seoul (KR); Gun-Yeal Lee, Ulsan (KR); Byoungho Lee, Seoul (KR); Yoonchan Jeong, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 334 days.

(21) Appl. No.: 18/490,121

(22) Filed: Oct. 19, 2023

(65) Prior Publication Data

US 2025/0028089 A1 Jan. 23, 2025

(30) Foreign Application Priority Data

Jul. 19, 2023 (KR) ........................ 10-2023-0093956

(51) Int. Cl.
*G02B 1/00* (2006.01)
*B82Y 20/00* (2011.01)
(Continued)

(52) U.S. Cl.
CPC ............ *G02B 3/0056* (2013.01); *B82Y 20/00* (2013.01); *G02B 1/002* (2013.01);
(Continued)

(58) Field of Classification Search
CPC ........ G02B 5/008; G02B 1/002; G02B 1/007; G02B 26/06; G02B 1/005; G02B 5/1809; G02F 1/292; G02F 2202/30
See application file for complete search history.

(56) References Cited

U.S. PATENT DOCUMENTS 11,747,521 B2 9/2023 Eo
2016/0299337 A1 10/2016 Arbabi et al.
(Continued)

FOREIGN PATENT DOCUMENTS

KR 10-2016-0120653 A 10/2016
KR 10-2020-0047612 A 5/2020
KR 10-2021-0042005 A 4/2021

OTHER PUBLICATIONS

Ethan Tseng, et al., "Neural nano-optics for high-quality thin lens imaging", Nature Communications, 2021, pp. 1-7.
(Continued)

*Primary Examiner* — Jonathan Y Jung
(74) *Attorney, Agent, or Firm* — Sughrue Mion, PLLC

(57) ABSTRACT

A double sided meta lens includes a substrate having a first surface and a second surface facing each other, a first meta lens that includes a plurality of first nanostructures arranged on the first surface of the substrate and exhibits a first phase profile, and a second meta lens that includes a plurality of second nanostructures arranged on the second surface of the substrate and exhibits a second phase profile. The first phase profile may be configured such that a central region of the first meta lens operates as a convex lens and a peripheral region of the first meta lens operates as a concave lens, and the second phase profile may correspond to a focusing lens and has a section in which an absolute value of a phase slope increases with distance from a center of the second meta lens.

10 Claims, 9 Drawing Sheets

(51) Int. Cl.

| | |
|---|---|
| ***G02B 3/00*** | (2006.01) |
| ***G02B 13/00*** | (2006.01) |
| ***H04N 23/80*** | (2023.01) |

(52) U.S. Cl.
CPC ......... *G02B 13/0085* (2013.01); *H04N 23/80* (2023.01); *G02B 2207/101* (2013.01)

(56) References Cited

U.S. PATENT DOCUMENTS

| | | | | |
|---|---|---|---|---|
| 2019/0064532 | A1 | 2/2019 | Riley, Jr. et al. | |
| 2020/0096672 | A1* | 3/2020 | Yu ........................ | G02B 5/1857 |
| 2021/0149081 | A1* | 5/2021 | Groever ............... | G02B 5/1842 |
| 2022/0082731 | A1* | 3/2022 | Mun ...................... | G02B 1/002 |
| 2022/0221741 | A1* | 7/2022 | Park ....................... | G02B 1/002 |
| 2024/0085241 | A1* | 3/2024 | Zhan .................. | G02B 27/0068 |
| 2024/0418907 | A1* | 12/2024 | Hu ......................... | G02B 1/002 |

OTHER PUBLICATIONS

Communication issued Apr. 17, 2025 in Korean Patent Application No. 10-2023-0093956.

* cited by examiner

FIRST META LENS
SECOND META LENS
COMPARATIVE EXAMPLE
Phase (radian)
0
−1000
−2000
−3000
−4000
−5000
−6000
$R_2$ Rc $R_1$ 0 $R_1$ Rc $R_2$
radial distance

DOUBLE SIDED META LENS AND ELECTRONIC DEVICE INCLUDING THE SAME

This invention was supported by Samsung Research Funding & Incubation Center of Samsung Electronics under Project Number SRFC-IT2001-05.

CROSS-REFERENCE TO RELATED APPLICATION

This application is based on and claims priority under 35 U.S.C. § 119 to Korean Patent Application No. 10-2023-0093956, filed on Jul. 19, 2023, in the Korean Intellectual Property Office, the disclosure of which is incorporated by reference herein in its entirety.

BACKGROUND

1. Field

The disclosure relates to a meta lens and an electronic device including the meta lens.

2. Description of the Related Art

Meta lenses include flat diffractive elements that utilize meta-structures. Such a meta lens is attracting increasing interest in many fields because the meta lens can exhibit various optical effects, which have not been achieved by existing refractive elements, and can make an optical system thin.

The meta-structure has a nanostructure in which values smaller than the wavelength of incident light are applied to the shape, period, or the like. Also, a phase profile suitable for the desired optical performance is set, and the details of the nanostructure are designed to satisfy the phase profile.

In existing refraction-based lenses, there is a limitation to reduce the thickness thereof because sufficient accumulated phases have to be obtained as light propagates through a medium. Also, since multiple lenses are used to correct Seidel aberration and chromatic aberration, there is a limitation in terms of a form factor.

In order to obtain high-quality images by applying the meta lens, which is free from the above limitation, to an image acquisition device, design methods capable of satisfying various requirements, such as the correction of chromatic aberration, the correction of monochromatic aberration, and the achievement of wide angles of view, are being explored.

SUMMARY

Provided are a double sided meta lens and an electronic device including the double sided meta lens.

Additional aspects will be set forth in part in the description which follows and, in part, will be apparent from the description, or may be learned by practice of the presented embodiments of the disclosure.

According to an aspect of the disclosure, a double sided meta lens includes a substrate having a first surface and a second surface facing each other, a first meta lens that includes a plurality of first nanostructures arranged on the first surface of the substrate and exhibits a first phase profile, and a second meta lens that includes a plurality of second nanostructures arranged on the second surface of the substrate and exhibits a second phase profile, wherein the first phase profile is configured such that a central region of the first meta lens operates as a convex lens and a peripheral region of the first meta lens operates as a concave lens, and the second phase profile corresponds to a focusing lens and has a section in which an absolute value of a phase slope increases with distance from a center of the second meta lens.

The second phase profile may be formed by summing a plurality of phase profiles, and each of the plurality of phase profiles may be configured such that a plurality of respective incident waves having different incident angles are focused on the same focal plane.

The first meta lens may be configured to correct monochromatic aberration of the second meta lens.

An effective diameter of the first meta lens may be smaller than an effective diameter of the second meta lens.

The double sided meta lens may have a viewing angle of 70° or more for light in a visible wavelength band.

The visible wavelength band may include red, green, and blue wavelength bands.

The first phase profile may be expressed by $$\sum_n a_n E\left(\frac{r}{R_1}\right)^{2n},$$

where $R_1$ is an effective radius of the first meta lens, and r is a distance from a center of the first meta lens, and the second phase profile may be expressed by $$\sum_n b_n E\left(\frac{r}{R_2}\right)^{2n},$$

where $R_2$ is an effective radius of the second meta lens, and r is a distance from the center of the second meta lens.

The coefficients $a_n$ and $b_n$ may be optimized to minimize a difference between an input image and an image reconstructed using a reconstruction algorithm.

The coefficients may be optimized to minimize changes in point spread functions depending on incident angles and wavelengths.

The section of the second phase profile may be in a region where a distance from the center of the second meta lens is ranged from $R_2/2$ to $R_2$.

According to another aspect of the disclosure, a double sided meta lens includes a substrate having a first surface and a second surface facing each other, a first meta lens that includes a plurality of first nanostructures arranged on the first surface of the substrate and exhibits a first phase profile, and a second meta lens that includes a plurality of second nanostructures arranged on the second surface of the substrate and exhibits a second phase profile, wherein the first phase profile and the second phase profile include functions which are optimized to minimize a difference between an input image and a reconstructed image such that the input image passing through the first meta lens and the second meta lens is reconstructed using a reconstruction algorithm.

The first phase profile may be expressed by $$\sum_n a_n E\left(\frac{r}{R_1}\right)^{2n},$$

where $R_1$ is an effective radius of the first meta lens, and r is a distance from a center of the first meta lens, and the second phase profile may be expressed by $$\sum_n b_n E\left(\frac{r}{R_2}\right)^{2n},$$

where $R_2$ is an effective radius of the second meta lens, and r is a distance from a center of the second meta lens.

The effective diameter of the first meta lens may be smaller than the effective diameter of the second meta lens.

The coefficients $a_n$ and $b_n$ may be updated and determined so that a loss function defined between the input image and the reconstructed image reconstructed using the reconstruction algorithm is reduced according to a gradient descent method.

The double sided meta lens may have a viewing angle of 70° or more for light in visible wavelength bands.

According to another aspect of the disclosure, an electronic device includes one of the double sided meta lenses described above, an image sensor configured to convert an optical image of an object into an electrical signal, the optical image being formed by the double sided meta lens, and an image reconstruction processor configured to execute a reconstruction algorithm and process the electrical signal from the image sensor.

According to another aspect of the disclosure, an electronic device includes a lens assembly including one of the double sided meta lenses described above and one or more refractive lenses, an image sensor configured to convert an optical image of an object into an electrical signal, the optical image being formed by the lens assembly, and an image reconstruction processor configured to execute a reconstruction algorithm and process the electrical signal from the image sensor.

According to another aspect of the disclosure, an image acquisition method includes setting two phase profiles, which are to be applied to a double sided meta lens, by using an end-to-end optimization technique, preparing the double sided meta lens in which the set two phase profiles are applied, obtaining, with an image sensor, a first image of an object formed by the double sided meta lens, and obtaining a second image by reconstructing the first image via a reconstruction network.

Parameters used in the reconstruction network may be optimized while using the end-to-end optimization technique.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
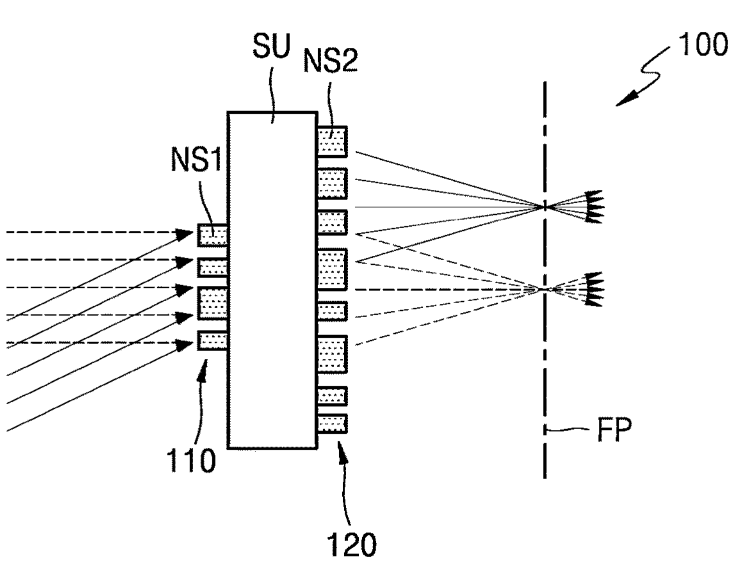
FIG. 1 is a cross-sectional view showing a schematic structure of a double sided meta lens according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments are described in detail with reference to the accompanying drawings. Embodiments described below are only examples, and it is possible to make various changes from the embodiments. In the following drawings, the same reference numerals refer to the same components, and the size of each of components in the drawings may be exaggerated for clarity and convenience of description.

Hereinafter, when an element is referred to as being "above" or "on" another element, not only may the element be directly above and in contact with another element, but also the element may be above but not in contact with another element.

Although terms, such as first and second, may be used to describe various elements, these terms are only used to distinguish one component from other components. These terms are not intended to limit that substances or structures of elements are different.

The singular forms include the plural forms as well, unless the context clearly indicates otherwise. In addition, when it is described that a part "includes" a certain component, this means that the part may further include other components, rather than excluding other components, unless specifically stated to the contrary.

In addition, terms used herein, such as " . . . part" and " . . . module" refer to a unit that processes at least one function or operation, which may be provided as hardware or software or as a combination of hardware and software.

The use of the term "the" and other demonstratives similar thereto may correspond to both a singular form and a plural form.

Operations in a method may be performed in any appropriate order, unless explicitly stated that the operations have to be performed in the mentioned order. Also, the use of all exemplary terms (e.g., "etc." or "and (or) the like") is only intended to describe a technical concept in detail. Unless limited by the claims, the scope of the disclosure is not necessarily limited by theses exemplary terms.

FIG. 1 is a cross-sectional view showing a schematic structure of a double sided meta lens 100 according to an embodiment.

The double sided meta lens 100 utilizes a nanostructure having sub-wavelength shape dimensions. The double sided meta lens 100 includes a plurality of first nanostructures NS1 and a plurality of second nanostructures NS2, which are respectively formed on both sides of a substrate SU. The plurality of first nanostructures NS1 constitute a first meta lens 110, and the plurality of second nanostructures NS2 constitute a second meta lens 120.

The first nanostructures NS1 and the second nanostructures NS2 may each include a material having a different refractive index from a surrounding material, for example, a material having a high refractive index. For example, the first nanostructures NS1 and the second nanostructures NS2 may include crystalline silicon (c-Si), polycrystalline silicon (p-Si), amorphous silicon (a-Si), group III-V compound semiconductors (GaP, GaN, GaAs, etc.), SiC, $TiO_2$, SiN and/or a combination thereof. The first nanostructures NS1 and the second nanostructures NS2 may include the same material, but the embodiment is not limited thereto.

Although not illustrated, regions around the first nanostructures NS1 may be filled with a material having a refractive index different from that of the first nanostructures NS1, for example, a dielectric material having a low refractive index. This surrounding material may entirely cover the first nanostructures NS1 to protect the first nanostructures NS1. For example, the surrounding material may include $SiO_2$ or air.

Also, although not illustrated, regions around the second nanostructures NS2 may be filled with a material having a refractive index different from that of the second nanostructures NS2, for example, a dielectric material having a low refractive index. This surrounding material may entirely cover the second nanostructures NS2.

The surrounding material of the first nanostructures NS1 and the surrounding material of the second nanostructures NS2 may be same, but the embodiment is not limited thereto.

The substrate SU may include transparent materials, such as glass (fused silica, BK7, etc.), quartz, polymer (PMMA, SU-8, etc.), and various plastic. The substrate SU may include a material having a lower refractive index than that of the first nanostructures NS1 and the second nanostructures NS2, but the embodiment is not limited thereto.

The sub-wavelength applied to the shape dimensions of the first nanostructures NS1 and the second nanostructures NS2 refers to a value smaller than the wavelength of incident light that is to be modulated. Also, the sub-wavelength refers to a value smaller than a central wavelength in the wavelength band of the incident light. The shapes and arrangements of the first nanostructures NS1 and the second nanostructures NS2 respectively provided in the first meta lens 110 and the second meta lens 120 may be set to modulate the incident light into a desired form. When describing common details of the first nanostructures NS1 and the second nanostructures NS2, these structures may be simply referred to as nanostructures. The sub-wavelength nanostructures may be referred to as meta-atoms, and arrays of nanostructures may be referred to as meta-surfaces.

The nanostructures have a refractive index different from that of surrounding materials and form a refractive index distribution depending on the shapes and arrangements of the nanostructures. The shapes of the wavefront connecting points of the same phase on a path of light are different before and after experiencing this refractive index distribution. In other words, the phase of light after passing through the meta-surface is different from the phase of light upon incident. This is expressed as a phase delay and may be expressed as a phase delay profile having a position-dependent distribution. Hereinafter, the phase formed by the meta-lens refers to the phase delay, that is, the phase relative to the phase of the incident light before entering the meta lens. Also, the terms 'phase' and 'phase delay' may be used interchangeably. For example, a phase, a phase delay, a phase delay profile, a phase profile, a phase distribution, and the like may be used together with the same meaning.

According to this phase profile, that is, according to a first phase profile by the first meta lens 110 and a second phase profile by the second meta lens 120, the double sided meta lens 100 according to an embodiment may have a wide viewing angle and exhibit optical performance with less aberration due to incident angles or wavelengths. For example, the double sided meta lens 100 may have a viewing angle of 70 degrees or more and exhibit optical performance with less chromatic aberration or monochromatic aberration. For example, as illustrated in the drawing, the double sided meta lens 100 may focus light of different wavelengths incident at different incident angles onto the same, that is, approximately the same focal plane FP. Here, the 'different incident angles' may range from about −35 degrees to about +35 degrees or may be a wider range, for example, a range in which the viewing angle is greater than 80 degrees. The 'light of different wavelengths' may include light in the visible light band, for example, in a range including all of red light, green light, and blue light. In FIG. 1, the light indicated by a solid line may be green light and the light indicated by a dotted line may be red light, but this is only an example.

The first phase profile may be configured such that a central region of the first meta lens 110 operates as a convex lens and a peripheral region of the first meta lens 110 operates as a concave lens.

The second phase profile may correspond to a focusing lens and have a section in which an absolute value of a phase slope increases with distance from a center of the second meta lens 120. The second phase profile may be formed by summing a plurality of phase profiles. Also, for example, each of the plurality of phase profiles may allow a plurality of respective incident waves having different incident angles to be focused on the same focal plane. Each of the plurality of phase profiles may allow a plurality of respective incident waves having different incident angles and wavelengths to be focused on approximately the same focal plane. The number of the plurality of phase profiles is at least 2 and may actually be much larger than 2. For example, incident waves having different wave number vectors (k-vectors) have different areas that reach the second meta lens 120, and the double sided meta lens 100 according to the embodiment takes into consideration all incident waves having continuous k-vectors. Also, a broadband wavelength range, for example, a wavelength in the visible light band, may be considered in these k-vectors. The final phase, which is obtained from the summation of the phase profiles required to focus incident waves having continuous k-vectors on the same focal plane, is reflected as the second phase profile.

The first meta lens 110 may correct monochromatic aberration, for example, coma aberration, of the second meta lens 120. The effective diameter of the first meta lens 110 may be smaller than the effective diameter of the second meta lens 120.

Figure 2:
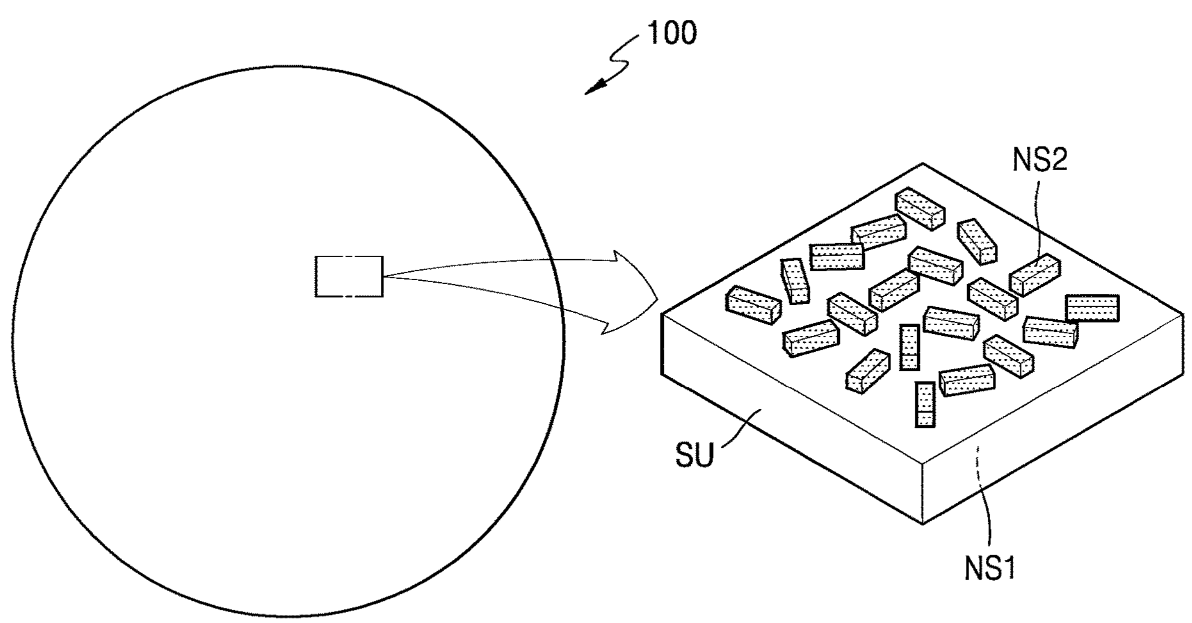
FIG. 2 is a view showing a detailed structure of the double sided meta lens according to an embodiment.

FIG. 2 is a view showing a detailed structure of the double sided meta lens 100 according to an embodiment.

FIG. 2 is an enlarged view of illustrating a dotted quadrangular region that is part of the double sided meta lens 100, and the arrangement of the illustrated second nanostructures NS2 is determined to form the second phase profile. For example, the second nanostructures NS2 may all have a rectangular parallelepiped shape of the same size, and the arrangement angles thereof may be adjusted for each position, so that the phase delay value required at that position may be satisfied. Although not specifically illustrated in the drawing, the first nanostructures NS1 may also be arranged to form the first phase profile in a similar manner. The first nanostructures NS1 may all have a rectangular parallelepiped shape of the same size, but may have a different size or shape from the second nanostructures NS2.

The above description is an example of forming a desired phase profile, and various other methods may also be used. For example, the first nanostructures NS1 and the second nanostructures NS2 may include not only a rectangular parallelepiped shape, but also a circular cylinder, an elliptic cylinder, and a polygonal prism shape having various sizes.

Figure 3:
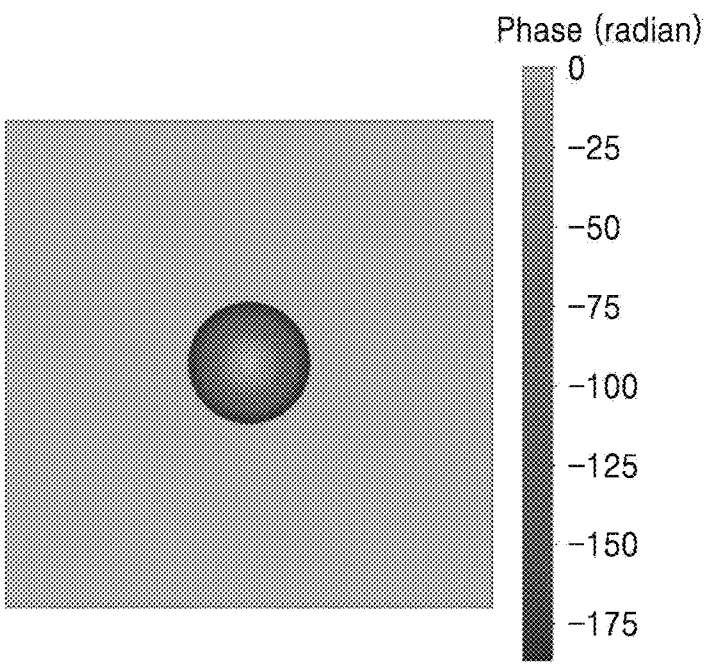
FIG. 3 is a phase distribution diagram formed by a first meta lens provided in the double sided meta lens according to an embodiment.
Figure 4:
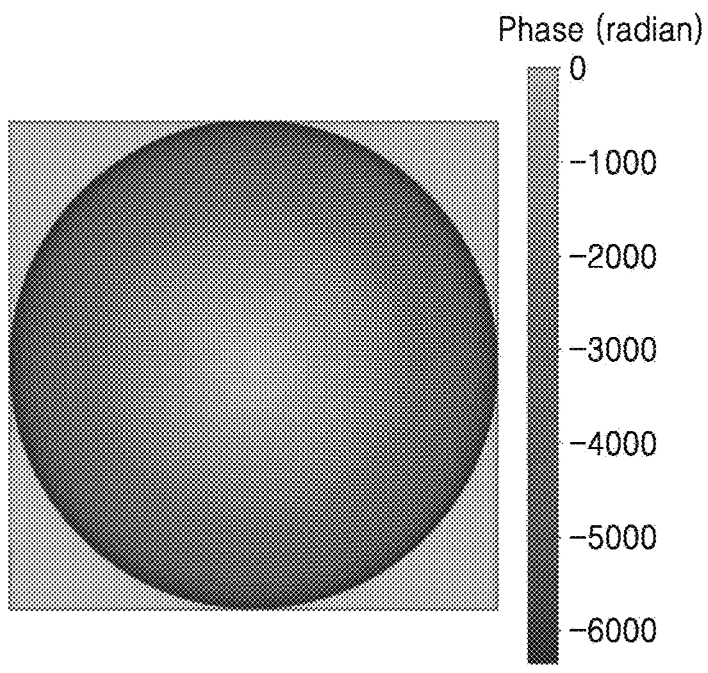
FIG. 4 is a phase distribution diagram formed by a second meta lens provided in the double sided meta lens according to an embodiment.
Figures 5, 6:
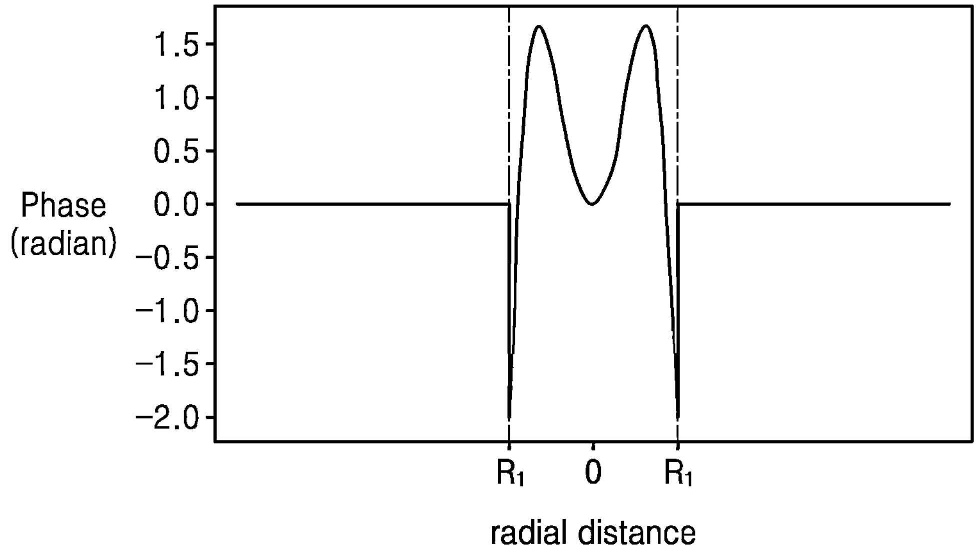
FIG. 5 is a graph showing a first phase profile formed by the first meta lens and a second phase profile formed by the second meta lens provided in the double sided meta lens according to an embodiment, together with a phase profile formed by a comparative example.
FIG. 6 is a detailed graph showing an enlarged vertical axis of phase distribution of the first meta lens in the graph of FIG. 5.

FIGS. 3 and 4 show phase distribution diagrams of the first meta lens 110 and the second meta lens 120 provided, respectively, in the double sided meta lens 100 according to an embodiment. FIG. 5 is a graph showing the phase distributions of the first meta lens 110 and the second meta lens 120 provided in the double sided meta lens 100 according to an embodiment, together with the phase distribution of a comparative example, and FIG. 6 is a detailed graph showing an enlarged vertical axis of phase distribution of the first meta lens 110 in the graph of FIG. 5.

These graphs show, as an example, a case in which the numerical aperture of the double sided meta lens 100 is 0.25, the effective diameter $2R_1$ of the first meta lens 110 is 400 μm, and the effective diameter $2R_2$ of the second meta lens 120 is 1100 μm.

For comparison with the second meta lens 120, the comparative example shows an example having a general hyperbolic phase distribution in which a design method described below is not applied.

The phase profile according to the comparative example shows an almost constant phase slope in peripheral regions. On the other hand, the second phase profile formed by the second meta lens 120 according to an embodiment has a phase slope greater than that of the comparative example, and the absolute value of the phase slope of the second meta lens 120 tends to increase with the distance from the center of the second meta lens 120. For example, in a section where the radial distance from the center is greater than or equal to $R_c$, the absolute value of the phase slope increases with distance. $R_c$ may be, for example, greater than or equal to $R_1$ or greater than or equal to $R_2/2$, or $R_c$ may have any value in the range from about 0 to about $R_2$. In other words, the second phase profile may have a form in which the absolute value of the phase slope increases with distance in a section where the distance from the center is greater than or equal to $R_1$ or greater than or equal to $R_2/2$. Alternatively, the second phase profile may have a form in which the absolute value of the phase slope increases with distance from the center over the entire section.

Alternatively, similar to the embodiment, the phase profile of the comparative example may have a form in which the absolute value of the phase slope tends to increase with distance from the center. Even in this case, the embodiment has a greater change in phase slope than the comparative Example. That is, the embodiment has a greater phase slope in peripheral regions than the comparative example. Due to this large phase slope, aberrations caused by light having a large k-vector component incident onto the peripheral region of the second meta lens 120 may be compensated by the first meta lens 110.

The meta lens, to which the phase profile of the comparative example is applied, has a limitation in aberration correction when the incident angle is large, and also has large chromatic aberration. On the other hand, the second phase profile is obtained by the design method described below in FIGS. 7 and 8 so that the above-described optical performance is achieved.

The two phase profiles applied to the double sided meta lens 100 according to an embodiment are not limited to the forms illustrated in FIG. 5. The first phase profile and the second phase profile shown in FIG. 5 are example forms capable of reducing aberrations caused by wide wavelengths and various incident angles. Depending on other requirements, for example, numerical apertures, focal lengths, effective diameters, etc., the detailed forms of theses profiles may vary.

Figure 7:
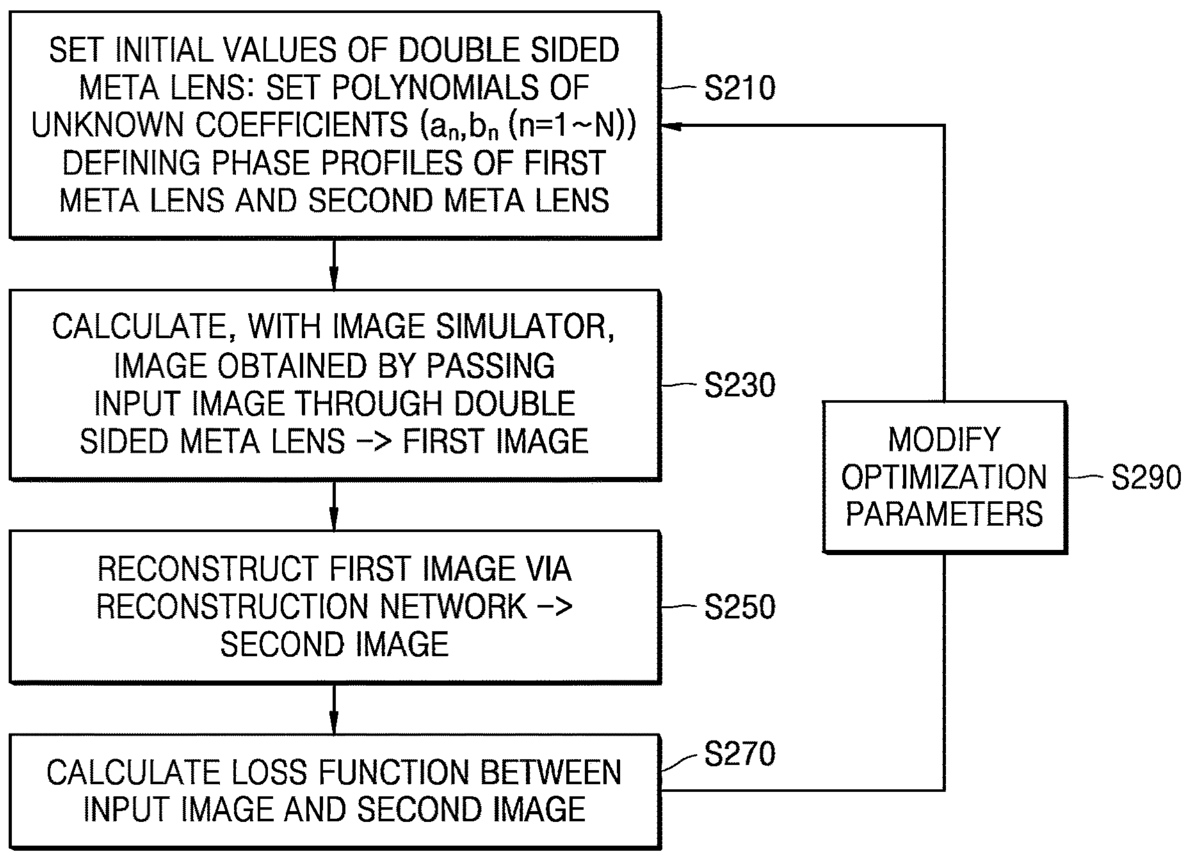
FIG. 7 is a flowchart schematically explaining a method of designing a double sided meta lens, according to an embodiment.
Figure 8:
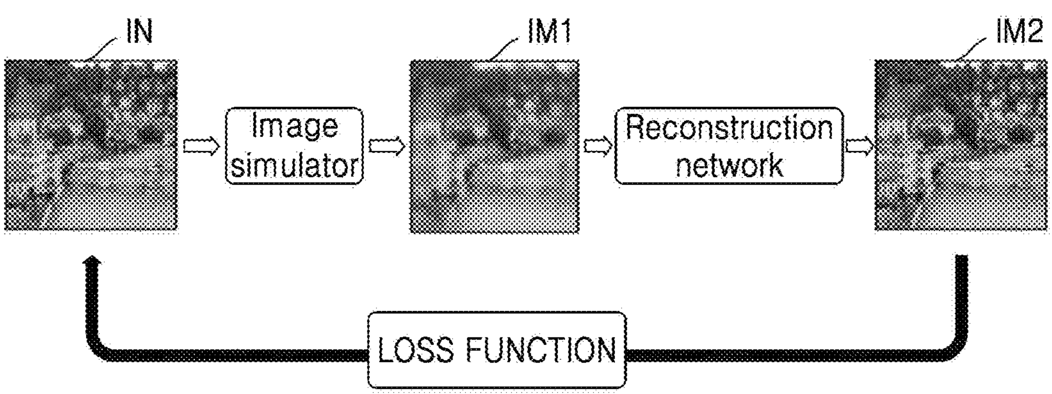
FIG. 8 is a flowchart describing a relationship between an input image, a first image, and a second image in the flowchart of FIG. 7.

FIG. 7 is a flowchart explaining a method of designing a double sided meta lens, according to an embodiment, and FIG. 8 is a flowchart describing a relationship between an input image IN, a first image IM1, and a second image IM2 in the flowchart of FIG. 7.

First, initial values of the double sided meta lens to be designed are set. That is, the first phase profile of the first meta lens and the second phase profile of the second meta lens are set as polynomials of unknown coefficients.

The first phase profile may be expressed as the following polynomial.

$$\sum_n a_n \cdot \left(\frac{r}{R_1}\right)^{2n} \tag{1}$$

Here, $R_1$ is the effective radius of the first meta lens, and r is the distance from the center on a lens surface of the first meta lens. Also, $a_n$ is an unknown coefficient, and n is an integer between 1 and N.

$$\sum_n b_n \cdot \left(\frac{r}{R_2}\right)^{2n} \tag{2}$$

Here, $R_2$ is the effective radius of the second meta lens, and r is the distance from the center on a lens surface of the second meta lens. Also, $b_n$ is an unknown coefficient, and n is an integer between 1 and N.

As in Expressions (1) and (2), the first and second phase profiles are defined as the sum of even order polynomials, and $a_n$ and $b_n$ are variables to be determined through an optimization process. However, the forms of the polynomials are not limited to Expressions (1) and (2), and may be changed to other forms that satisfy symmetry conditions. The functions of the first and second phase profiles may be defined as the sum of polynomials of different even orders. For example, a Zernike polynomial may be used in these phase profiles.

This type of setup is basically related two meta-surfaces arranged adjacently and thus facilitates the aberration, that is, the monochromatic aberration correction.

Next, an image obtained by passing the input image IN through the double sided meta lens is calculated using an image simulator to thereby obtain the first image IM1. Based on wave optics theories, the image simulator may find out what type of image is formed on a focal plane after the input image IN passes through the double sided meta lens.

The first image IM1 computed in the process described above has a low quality due to aberration as illustrated in FIG. 8. This first image IM1 is reconstructed into the second image IM2 through a reconstruction network.

This reconstruction process may be performed by various end-to-end learning techniques. For example, a U-Net structure using a convolutional neural network (CNN) may be used. In the image reconstruction using such a deep neural network, not only the network structure but also the dataset and loss function may be considered. Also, the INRIA Holidays dataset may be used, which reflects rotation, a view point, blurring, and lighting changes, and various environments.

Next, the loss function between the input image IN and the second image IM2 is calculated (S270).

The loss function (Loss) may be defined as follows.

$$\text{Loss} = \alpha_1 L2(\hat{y}, y) + \alpha_2(1 - SSIM(\hat{y}, y)) \quad (3)$$

In Equation (3), $\hat{y}$ represents the second image IM2, which is the reconstructed image, and y represents the input image IN, which is a truth image.

As in Equation (3) above, the loss function may be defined as the sum of the L2 loss and the structural similarity index measure loss between the second image IM2 and the input image IN. Here, $\alpha_1$ and $\alpha_2$ are weight constants. The L2 loss may be defined as a value which is obtained by squaring an error between y and y and adding the resultant value by the number of pixels.

Considering the loss function, optimization parameters are modified (S290), and operations of S210, S230, S250, and S270 are repeated. The optimization parameters include coefficients $a_n$ and $b_n$ and parameters used in the reconstruction network. The process of modifying optimization parameters may include a process in which gradients are calculated for the coefficients and network parameters related to the two phase profiles of the double sided meta lens, starting from the gradient of the loss function, through backpropagation. The optimization parameters may be updated so that the loss function is reduced for each iteration using a gradient descent method.

This method involves an end-to-end optimization technique, and accordingly, it is possible to jointly optimize the two phase profiles of the double sided meta lens and the parameters of the CNN-based reconstruction network. In other words, according to this method, the coefficients defining the two phase profiles to be applied to the double sided meta lens are optimized. Also, it is possible to optimize the parameters which are used in the reconstruction network that reconstructs the image obtained by the double sided meta lens manufactured by applying these two phase profiles.

Figure 9:
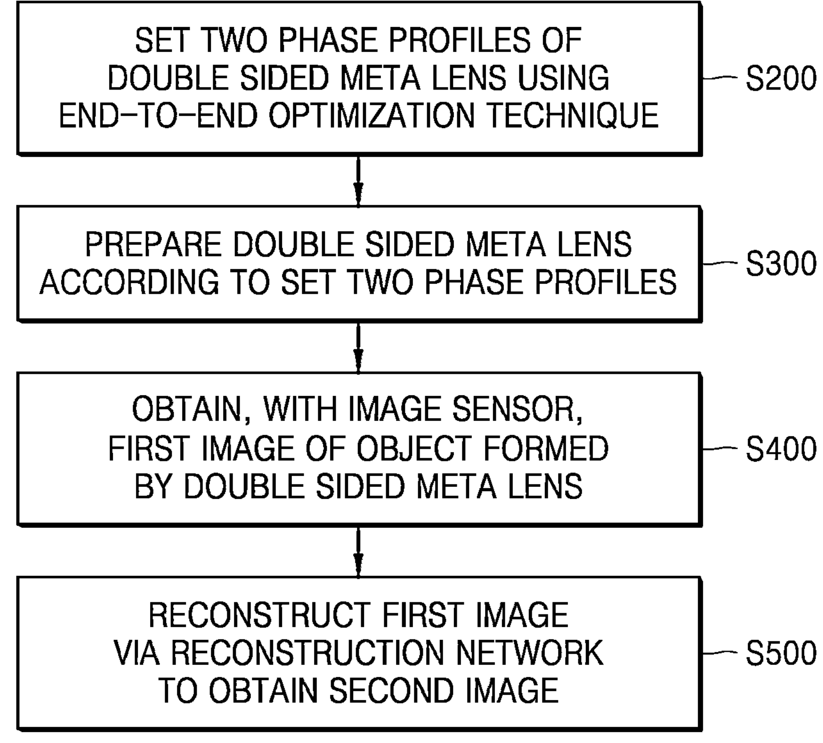
FIG. 9 is a flowchart schematically explaining an image acquisition method according to an embodiment.

FIG. 9 is a flowchart schematically explaining an image acquisition method according to an embodiment.

First, two phase profiles, which are to be applied to a double sided meta lens, are set by using an end-to-end optimization technique (S200). This process corresponds to the process described in FIG. 7. That is, the coefficients defining the two phase profiles of the double sided meta lens to be manufactured may be optimized by the end-to-end optimization method. In addition, the parameters of the reconstruction network to be used when reconstructing images may also be optimized.

Next, a double sided meta lens is prepared according to the two determined phase profiles (S300). For example, nanostructures having determined positions and shapes may be arranged two-dimensionally on both sides of a substrate, using a meta-atom library. The nanostructures may be manufactured from an amorphous silicon material that exhibits a high refractive index throughout the visible light band, but the embodiment is not limited thereto.

Next, a first image is obtained through an imaging system equipped with the double sided meta lens that is prepared as described above (S400). The first image IM1 includes an optical image of an object that is formed on an image sensor of the imaging system by a double sided meta lens.

The first image obtained as described above may be reconstructed through a reconstruction network (S500). The parameters of the reconstruction network may be optimized together during the process of optimizing the phase profiles of the double sided meta lens (S200). Through this reconstruction network, various aberrations existing in the first image may be corrected, and a second image having a good quality may be obtained.

According to an image acquisition method using this optimization method, it is possible to obtain higher quality images than when using only software to reconstruct images that are blurred due to chromatic and monochromatic aberrations that occur during the image formation process in hardware.

In viewpoint of the point spread function, the performance of the double sided meta lens according to the embodiment manufactured by the design method described in FIG. 7 will be explained in comparison with a comparative example.

Figure 10:
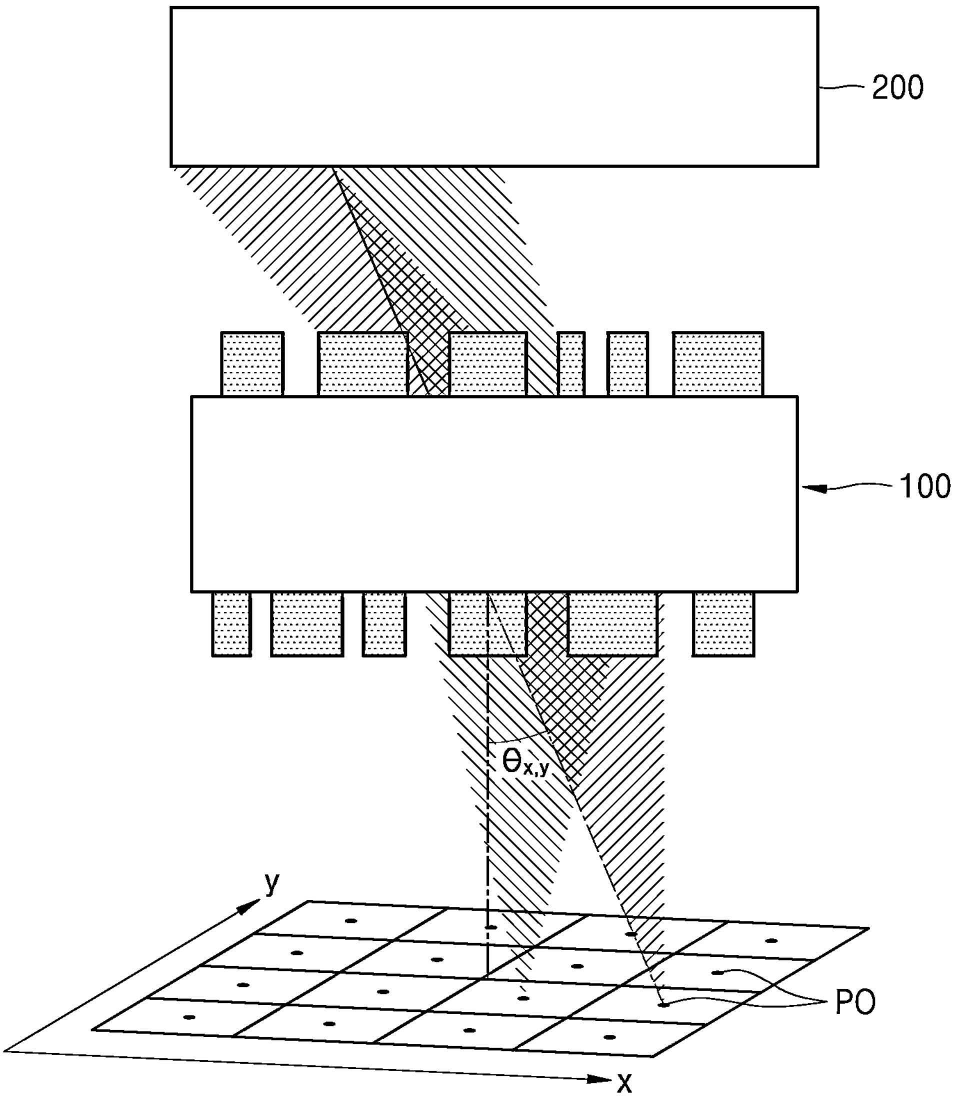
FIG. 10 conceptually shows a method of obtaining a point spread function according to various incident angles.
Figure 11:
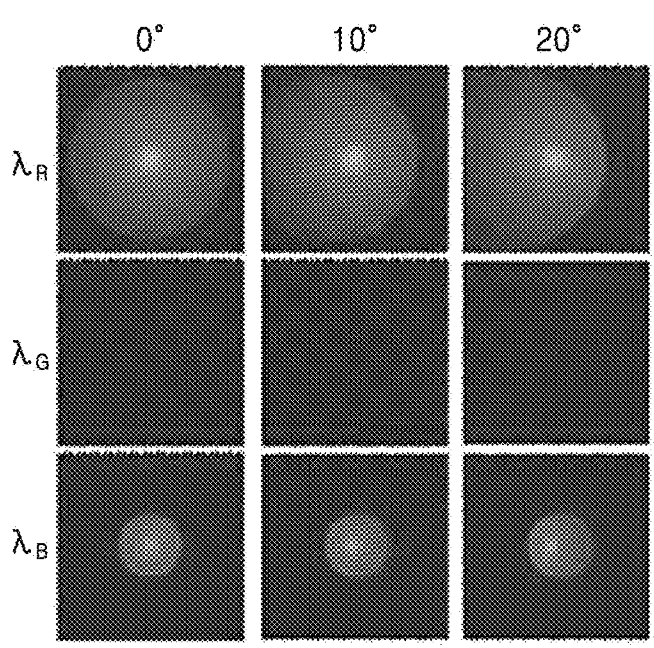
FIG. 11 is a distribution diagram showing a point spread function, which is formed by the double sided meta lens of the comparative example, with respect to various wavelengths and incident angles.
Figure 12:
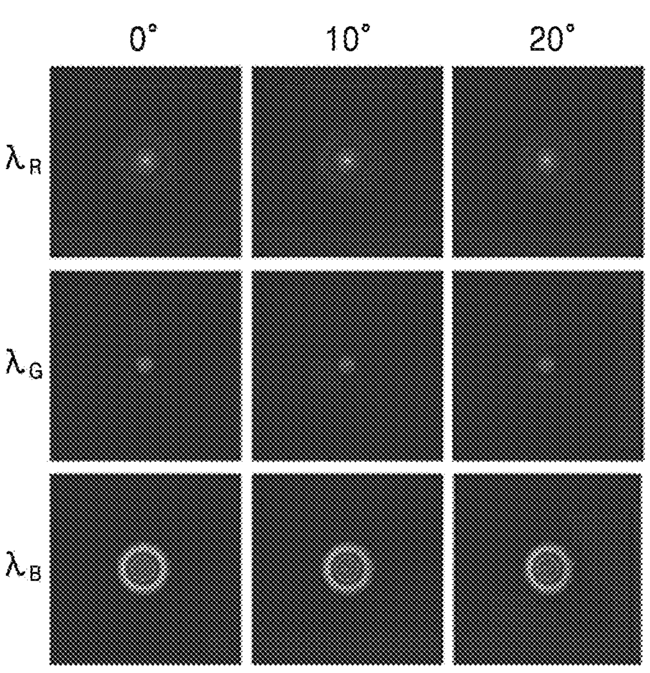
FIG. 12 is a distribution diagram showing a point spread function, which is formed by the double sided meta lens of the embodiment, with respect to various wavelengths and incident angles.

FIG. 10 conceptually shows a method of obtaining a point spread function according to various incident angles. FIG. 11 is a distribution diagram showing a point spread function, which is formed by a double sided meta lens of the comparative example, according to various wavelengths and incident angles, and FIG. 12 is a distribution diagram showing a point spread function, which is formed by the double sided meta lens 100 of the embodiment, with respect to various wavelengths and incident angles.

The point spread function refers to the distribution of light intensity formed on an image plane as a result of imaging of an imaging system for a point object. The point object may include, for example, a point light source that forms a spherical wave.

As illustrated in FIG. 10, light from point objects PO at various locations is incident onto the double sided meta lens 100 at different incident angles. As the point objects PO, point light sources in the red wavelength band, point light sources in the green wavelength band, and point light sources in the blue wavelength band may be arranged and used at various locations. Through a method described above, the point spread function according to various incident angles and wavelengths may be obtained.

FIG. 11 shows the point spread function obtained by the double sided meta lens according to the comparative example. The double sided meta lens according to the comparative example is manufactured without using the design method according to the embodiment and thus shows a phase profile different from that of the double sided meta lens according to the embodiment. For example, the double sided meta lens according to the comparative example may exhibit the phase profile that is illustrated as the comparative example in FIG. 5.

Referring to FIG. 11 for the comparative example, point light sources of a green wavelength $\lambda_G$ are imaged as points with almost no blurring. Also, there is substantially no difference depending on the incident angles. On the other hand, point light sources of a blue wavelength $\lambda_B$ are imaged as circular shapes with large blurring, and there is also a large difference depending on the incident angles. Also, point light sources of a red wavelength $\lambda_R$ are imaged as circular shapes with larger blurring, and there is also a large difference depending on the incident angles.

Referring to FIG. 12 for the embodiment, the imaging results of point light sources of three wavelengths $\lambda_R$, $\lambda_G$, and $\lambda_B$ show little difference depending on the incident angles. In addition, the imaging results from the point light sources of the red wavelength $\lambda_R$ and the green wavelength $\lambda_G$ are very similar to each other, and the imaging results from the point light sources of the blue wavelength $\lambda_B$ also show much less blurring compared to the comparative example. The difference in point spread functions depending on the wavelengths in the embodiment is also smaller than the difference in point spread functions depending on the wavelengths that appears in the comparative example.

As described above, it may be seen that the double sided meta lens according to the embodiment exhibits the point spread function with small variations according to various wavelengths and various incident angles within the visible light band.

Figure 13:
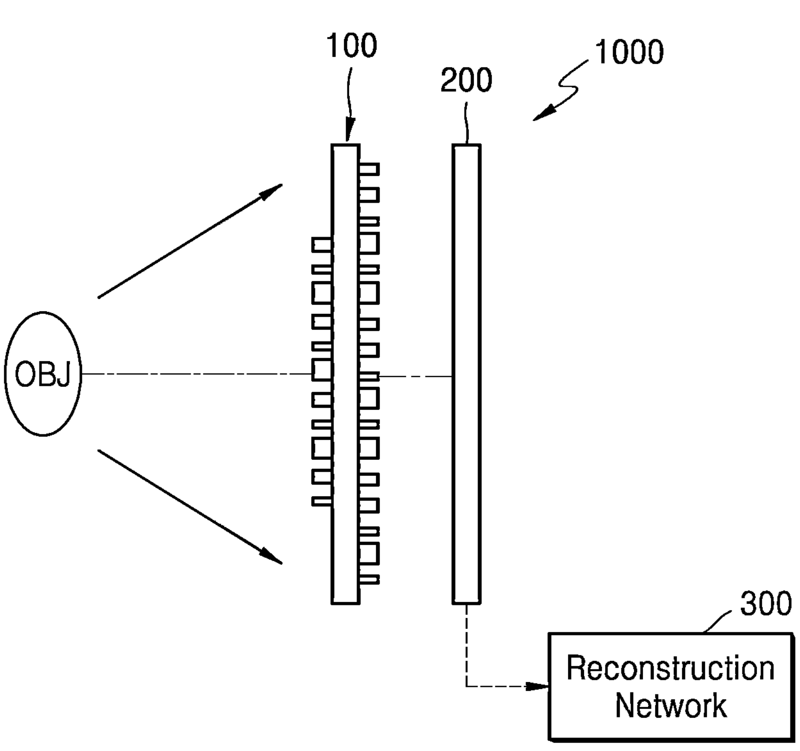
FIG. 13 shows an electronic device according to an embodiment.

FIG. 13 shows an electronic device 1000 according to an embodiment.

The electronic device 1000 includes an imaging device for obtaining an image of an object OBJ and includes a double sided meta lens 100, an image sensor 200, and an image reconstruction processor 300.

The image sensor 200 may include a plurality of light sensing element arrays that convert an optical image of the object OBJ into an electrical signal. The image sensor 200 may include, but is not limited to, a photoelectric conversion element (e.g., a photodiode), a charged coupled device (CCD) sensor, or a complementary metal oxide semiconductor (CMOS) image sensor.

The image reconstruction processor 300 may execute a reconstruction network. The image reconstruction processor 300 may use a reconstruction network to reconstruct an image obtained from the image sensor 200 into an image having less aberration. The reconstruction network may use a CNN-based U-net algorithm, and the parameters used in this network may have been optimized in advance during a process of designing phase profiles of the double sided meta lens 100. However, the reconstruction network used in the image reconstruction processor 300 is not limited thereto, and various algorithms available for image reconstruction may be used, such as U-net, generative adversarial networks (GAN), or modified algorithms thereof.

The image sensor 200 may also include a general image signal processor (ISP). The ISP may process electrical signals that are obtained from an image formed on an image surface of the image sensor 200 and may perform various image processes.

The image reconstruction processor 300 may be integrated into the ISP.

The electronic device 1000 provides high-quality images with less aberration and has a structure suitable for miniaturization by using the double sided meta lens 100. The electronic device 1000 may be employed in, for example, a smartphone or the like.

Figure 14:
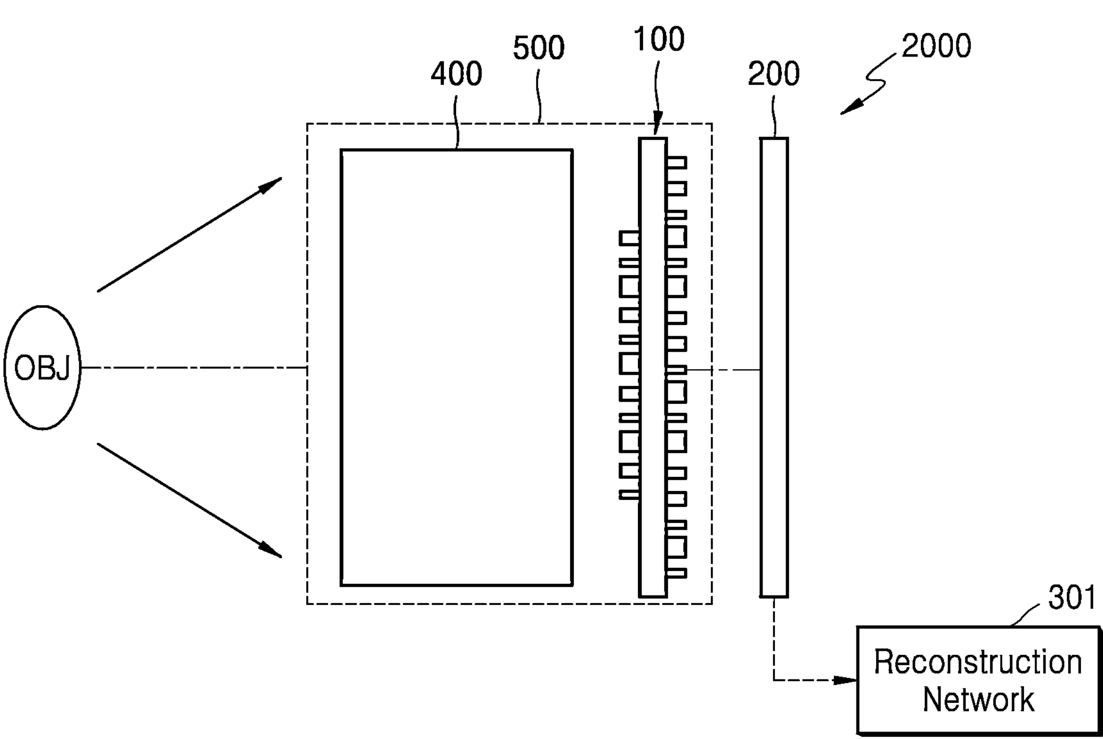
FIG. 14 shows an electronic device according to another embodiment.

FIG. 14 shows an electronic device 2000 according to another embodiment.

The electronic device 2000 includes a lens assembly 500, which includes a double sided meta lens 100, and an image sensor 200. The lens assembly 500 includes the double sided meta lens 100 according to an embodiment and a lens unit 400 including one or more refractive lenses. The location of the double sided meta lens 100 within the lens assembly 500 is not limited to a location shown in the drawing. The double sided meta lens 100 may be moved to another location within the lens assembly 500 or may be located within the lens unit 400. The image sensor 200 converts an optical image of an object, which is formed by the lens assembly 500, into an electrical signal.

The electronic device 2000 may also include an image reconstruction processor 301 that executes a reconstruction algorithm and processes signals from the image sensor 200. The image reconstruction processor 301 provided in the electronic device 2000 according to the embodiment may execute a reconstruction network of a different type or with different optimized coefficients from the image reconstruction processor 300 illustrated in FIG. 13.

This embodiment may be proposed to improve image quality by adding additional hardware. For example, the double sided meta lens 100 may display phase profiles obtained through an end-to-end optimization technique considering a lens configuration of the lens unit 400, and the parameters of the reconstruction network executed in the image reconstruction processor 301 may be optimized in advance during the above design process.

The electronic device 2000 may also be connected to other post-processing processors and perform various tasks, such as depth extraction imaging and image classification.

The double sided meta lens 100 according to an embodiment may be applied to various electronic devices. The electronic devices 1000 and 2000 having the double sided meta lens 100 may be applied to mobile phones, smartphones, tablet personal computers (PCs), smart PCs, digital cameras, camcorders, laptop computers, televisions, smart televisions, smart refrigerators, security cameras, robots, medical cameras, or the like. The electronic device that is less restricted by a form factor may be obtained by using the double sided meta lens 100 that is lightweight due to nanostructures thereof.

By using the above-described double sided meta lens, the high-quality images with almost no chromatic aberration and monochromatic aberration may be formed over a wide viewing angle.

The above-described double sided meta lens may have a high degree of design freedom and also have a lightweight structure.

The above-described double sided meta lens may be applied to the imaging device capable of high-quality imaging.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A double sided meta lens comprising:

a substrate having a first surface and a second surface facing each other;

a first meta lens that comprises a plurality of first nanostructures arranged on the first surface of the substrate and exhibits a first phase profile; and a second meta lens that comprises a plurality of second nanostructures arranged on the second surface of the substrate and exhibits a second phase profile, wherein the first phase profile is configured such that a central region of the first meta lens operates as a convex lens and a peripheral region of the first meta lens operates as a concave lens, and the second phase profile corresponds to a focusing lens and has a section in which an absolute value of a phase slope increases with distance from a center of the second meta lens, wherein the first phase profile is expressed by $$\sum_n a_n \cdot \left(\frac{r}{R_1}\right)^{2n},$$

where $R_1$ is an effective radius of the first meta lens, and r is a distance from a center of the first meta lens, and wherein the second phase profile is expressed by $$\sum_n b_n \cdot \left(\frac{r}{R_2}\right)^{2n},$$

where $R_2$ is an effective radius of the second meta lens, and r is a distance from the center of the second meta lens, and wherein coefficients $a_n$ and $b_n$ are optimized to minimize a difference between an input image and an image reconstructed using a reconstruction algorithm, wherein the section of the second phase profile is in a region where a distance from the center of the second meta lens ranges from $R_2/2$ to $R_2$.

2. The double sided meta lens of claim 1, wherein the second phase profile is formed by summing a plurality of phase profiles, and each of the plurality of phase profiles is configured such that a plurality of respective incident waves having different incident angles are focused on a same focal plane.

3. The double sided meta lens of claim 1, wherein the first meta lens is configured to correct monochromatic aberration of the second meta lens.

4. The double sided meta lens of claim 1, wherein an effective diameter of the first meta lens is smaller than an effective diameter of the second meta lens.

5. The double sided meta lens of claim 1, wherein the double sided meta lens has a viewing angle of 70° or more for light in a visible wavelength band.

6. The double sided meta lens of claim 5, wherein the visible wavelength band includes red, green, and blue wavelength bands.

7. The double sided meta lens of claim 1, wherein the coefficients are optimized to minimize changes in point spread functions depending on incident angles and wavelengths.

8. The double sided meta lens of claim 1, wherein the coefficients $a_n$ and $b_n$ are updated and determined so that a loss function defined between the input image and the reconstructed image reconstructed using the reconstruction algorithm is reduced according to a gradient descent method.

9. An electronic device comprising:

the double sided meta lens of claim 1;

an image sensor configured to convert an optical image of an object into an electrical signal, the optical image being formed by the double sided meta lens; and an image reconstruction processor configured to execute a reconstruction algorithm and process the electrical signal from the image sensor.

10. An electronic device comprising:

a lens assembly comprising the double sided meta lens of claim 1 and one or more refractive lenses;

an image sensor configured to convert an optical image of an object into an electrical signal, the optical image being formed by the lens assembly; and an image reconstruction processor configured to execute a reconstruction algorithm and process the electrical signal from the image sensor.

* * * * *